UNITED STATES PATENT OFFICE.

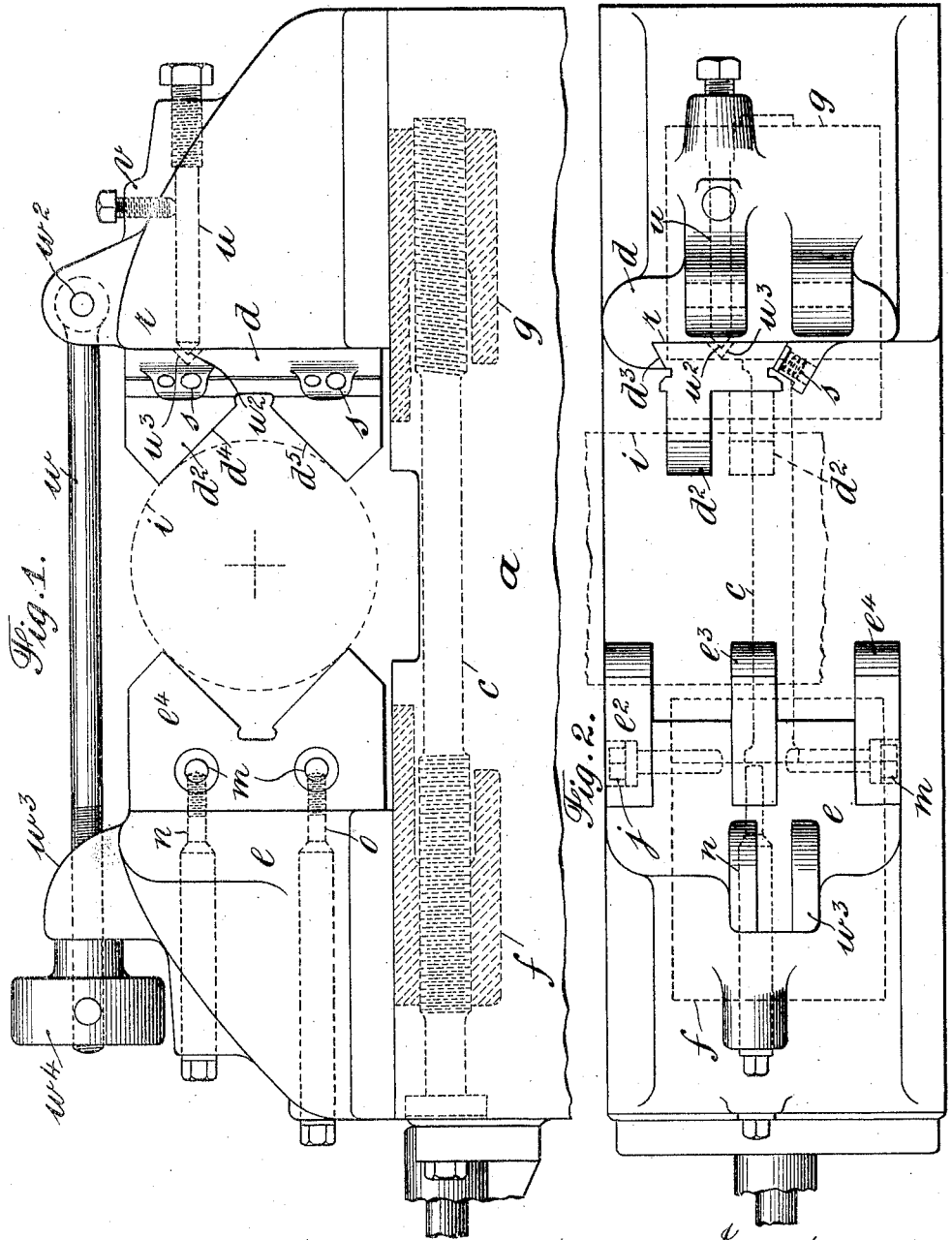

GEORGE BENJAMIN TAYLOR, OF BIRMINGHAM, ENGLAND.

VISE.

1,326,804.  Specification of Letters Patent.  Patented Dec. 30, 1919.

Application filed December 26, 1916. Serial No. 139,021.

*To all whom it may concern:*

Be it known that I, GEORGE BENJAMIN TAYLOR, subject of the King of Great Britain, residing at Bartholomew street, Birmingham, in the county of Warwick, England, have invented certain new and useful Improvements in Vises, of which the following is a specification.

The invention relates to a vise of the kind having self centering jaws, such as opposed V-shaped jaws, adapted for holding bars or tubes to automatically center same in relation to a machine for operating upon them, as, for instance, a cutting off machine by which pieces are cut from the bar or tube.

The ordinary type of such self centering vise to which the invention refers provides two rigidly built jaws traversable toward and away from each other upon a suitable bed by a single screw-threaded shaft cut with right and left hand screw threads, said jaws operating to hold varying diameters of bars coincident to a fixed center line which in the case of a cutting off machine is the axis of said machine.

In the use of such a vise in connection with a machine by which pieces are cut from the bar or tube, accurate self centering is frequently impossible owing to irregularities of shape of the bar or tube, particularly in the case of forged bars, where even the truest of the circular sectioned ones are irregular enough to prevent the grip of the vise being accurate for centering the bar in relation to the cutting off tools, particularly in the type of cutting off machine described in the specifications of prior British Letters Patent No. 25223 of 1910, where a plurality of tools need to do the same amount of work on the bar in cutting off a piece.

The object of the invention is to improve the construction of such a vise so that the automatic centering of an irregular formation of bar to the tools may be more accurate. Said invention consists essentially in making the V grip or grips of the one jaw slidable to self adjust vertically to the cross section of the bar to thereby cause an irregular shaped bar to be properly gripped and held between the faces of the opposed centralizing V's: for example assuming the bar to lie in the horizontal plane the V grip of the one jaw is made slidable to adjust itself vertically while the other jaw is a V grip, the adjustable grip moving vertically as the jaws grip the bar to compensate for irregularities in the bar so that cross sectionally the bar is always held by the grips at four points, namely, on each face of the two opposed V's. The self adjusting grip may be provided with means for limiting its downward movement when the grip of the jaws on the bar is relieved.

One form of the invention provides the self adjusting grip on a carrier moving vertically in slideways of the jaw and arranged to be removed from the slideway to dispose the grip in a different position relatively to the jaw.

A vise according to the invention is represented by the accompanying sheet of drawings, in elevation in Figure 1, and in plan in Fig. 2.

The bed $a$ is a rigidly built structure providing a mounting for a traversing screw $c$ and for the two jaws proper $d$ and $e$ which are arranged to slide upon said bed in suitable "ways" and are connected with the traversing screw $c$ by screw boxes $f$ and $g$. The traversing screw is revolved by a hand wheel and is a right and left hand one causing both jaws to traverse toward and away from each other to an equal extent upon the bed in relation to the center of the dotted circle $i$ which represents the largest diameter bar to be gripped by the vise.

Said jaws proper $d$ and $e$ are provided with segmental V-shaped intersecting grips, the one grip $d^2$ being carried by the jaw proper $d$ and the three grips $e^2$, $e^3$, and $e^4$ by the jaw proper $e$. The latter three grips are fixed to the jaw proper to provide a wide jaw, namely, by the end grips $e^2$ $e^4$ and the middle grip $e^3$, spaces being provided between the three jaws. The end grips are securely bolted to the jaw proper by the screw bolts $j$ and $m$ and the middle grip to said jaw proper by the screw bolts $n$ and $o$.

The grip $d^2$ is provided at one side of the center of an integral stiffly working slide $r$ forming the base of the said grip, which slide is arranged to move truly vertically in a guideway $d^3$ of the jaw proper $d$. Said slide $r$ is made to work stiffly by a spring device $s$ and will adjust itself vertically in its guideway to cause the faces $d^4$ $d^5$ of the V grip $d^2$ to adjust themselves to the bar $i$ which although somewhat irregular in its shape will always be properly gripped between the inclined faces of this adjustable grip and the inclined faces of the V grips $e^2$, $e^3$ and $e^4$. The adjustable grip $d^2$ is shown in full lines in Fig. 2 operating to grip in conjunction with only two grips $e^2$ $e^3$ of the grips, a short bar $i$ being then more conveniently gripped, but if a longer bar is to be gripped the two rigid end grips $e^2$ $e^4$ only are used and the adjustable grip $d^2$ is positioned in the manner represented by the dotted lines $t$ Fig. 2 to operate at the middle of the two end grips $e^2$ $e^4$ the bar being always gripped at three points. When the jaw $d^2$ is used in the position shown in full lines the jaw $e^4$ is entirely removed, and when the jaw $d^2$ is positioned as shown in dotted lines, the jaw $e^3$ is entirely removed.

The self adjusting grip $d^2$ is vertically uncontrolled except by sliding in its guideway within the jaw proper $d$ although its necessary compensating movement for irregular shaped bars is always small in extent but said grip may be prevented from falling when the grip of the jaws is relieved by the screw bolt $u$ carried by the jaw $d$ whose point $u^2$ is adapted to loosely enter a recess $u^3$ formed in the back of the slide $r$, which bolt may be locked in position by the secondary bolt $v$ also carried by the jaw carrier $d$. The bolt $u$ may be screwed fully home into the recess $u^3$ to make the grip $d^2$ solid with the jaw carrier $d$.

$w$ is a screw-threaded bolt pivoted at $w^2$ to the jaw proper $d$ and provided at $w^4$ with a nut which by operation against a lug $w^3$ of the jaw carrier $e$ serves to forcibly pull the jaws into good gripping contact after the traversing screw $c$ has done its work in a position above the grips.

It is to be understood that the vise shown is adapted to grip in a self-centering manner varying sizes of bars $i$, the jaws being made intersecting to accommodate as small a diameter of bar as possible.

Having now described my invention, what I claim and desire to secure by Letters Patent is:—

1. In a vise of the class specified, the combination of a bed, jaws adjustably supported on the bed in opposition. the one jaw being provided with a removable single grip device with angular gripping faces forming a V-shaped recess, the said single grip device having a sliding mounting and a vertical self-adjustment, the remaining jaw having three grips removably mounted therein to provide for an alinement of the said single slidable grip of the opposing jaw with the space between the multiple grips of the remaining jaw, the said slidable grip having recess means in the back portion thereof, a securing device being carried by the jaw holding the said slidable grip for engagement with said recess means and whereby the slidable grip may be at times locked in immovable position.

2. In a vise of the class specified, the combination of a bed, jaws adjustably supported on the bed in opposition and movable to and from each other, the one jaw being provided with a single slidably mounted grip device having a self-vertical adjustment and also shiftable in opposite lateral directions and provided with angular gripping faces forming a V-shaped recess, and the other jaw having a plurality of removable grip devices with similar angular faces and normally held in fixed position, the said removable grip devices being detached and applied as required to vary the extent of grip of the jaw supporting the same relatively to the work, the single slidable grip device being adjusted laterally in alinement with the space between two of the said plurality of gripping devices in the opposing jaw, whereby a greater gripping bearing relatively to a pipe or other article held by the vise being provided by removing the intermediate gripping device of the plurality of gripping devices of the one jaw and shifting the opposing slidable gripping device in alinement with the space between the remaining two gripping devices of the plurality of the latter in the opposing jaw, and a lesser gripping action provided by shifting the slidable gripping device to register with the space between the outermost and intermediate gripping devices of the plurality of the latter in the opposing jaw.

In testimony whereof I have hereunto set my hand in presence of two subscribing witnesses.

GEORGE BENJAMIN TAYLOR.

Witnesses:
    GEO. FUERY,
    D. LEAKER.